United States Patent
Bakó et al.

[11] Patent Number: 5,883,030
[45] Date of Patent: Mar. 16, 1999

[54] GLASS COMPOSITION

[75] Inventors: Zoltán László Bakó, Dunakeszi; Zoltán Kamill Suha, Budapest; Zsuzsanna Klára Varga, Dunakeszi, all of Hungary

[73] Assignee: General Electric Company, Schenectady, N.Y.

[21] Appl. No.: 899,439

[22] Filed: Jul. 24, 1997

[30] Foreign Application Priority Data

Jul. 30, 1996 [HU] Hungary ................................ 9602086

[51] Int. Cl.$^6$ ....................................................... C03C 3/89
[52] U.S. Cl. ........................... 501/66; 501/67; 501/69; 501/70; 501/72; 313/480; 313/636
[58] Field of Search ............................ 501/66, 67, 69, 501/70, 72; 313/400, 636

[56] References Cited

U.S. PATENT DOCUMENTS 5,391,523  2/1995  Marlor ............................... 501/14

FOREIGN PATENT DOCUMENTS

| 0 603 933 | 6/1994 | European Pat. Off. . |
| 603933 | 6/1994 | European Pat. Off. . |
| 195 47 567 | 7/1996 | Germany . |
| 48-6012 | 1/1974 | Japan . |

OTHER PUBLICATIONS

Database WPI, Section Ch, Week 7432, Derwent Publications Ltd., London, GB; Class L02, AN 74–57500V, XP002046648 & JP 49 006 012 A (Tokyo Shibaura Electric Co), 19 Jan. 1974 *abstract*.

Chemical Abstracts, vol. 123, No. 16, 16 Oct. 1995, Columbus, Ohio, US; abstract No. 206791, Halfar, Jaroslav: "Lead-free crystal glass", XP002046647, *abstract* & CZ 278 012 A (Ornela, A. S., Czech Rep.).

*Primary Examiner*—Melissa Bonner
*Attorney, Agent, or Firm*—Pearne, Gordon, McCoy & Granger LLP

[57] ABSTRACT

The invention relates to a glass composition for electric lamps comprising $SiO_2$, $Al_2O_3$, $Na_2O$, $K_2O$, $Li_2O$, $B_2O_3$, BaO, CaO and MgO, in addition optionally SrO, $Sb_2O_3$, $MnO_2$, $Fe_2O_3$, and/or $CeO_2$. The glass composition according to the invention is characterized in that its $B_2O_3$ content is 1 to 5 mass %, $K_2O$ content is 7.2 to 11 mass %, BaO content is 5.5 to 9 mass % and MgO content is 2.1 to 4 mass %, furthermore in addition to the components listed, it optionally also comprises maximum 3.5 mass % ZnO, maximum 1.2 mass % $TiO_2$ and maximum 0.8 mass % $P_2O_5$ with the condition that the total amount of CaO, MgO and ZnO in the composition is at least 5.8 mass %. Stems and bulbs made of the above glass composition and used in electric lamps are also subject matters of the invention.

14 Claims, 2 Drawing Sheets

GLASS COMPOSITION

BACKGROUND OF THE INVENTION

The invention relates to a glass composition which is suitable for use primarily in electric light sources.

Some glass parts of electric lamps as stems of incandescent and fluorescent lamps and the exhaust tubes thereof as well as the bulbs of some fluorescent lamps have been made of glasses with relatively high (20 to 29 mass %) lead oxide content for a long time. With these glasses, the high lead oxide content provides for the expected high electric resistance and the acceptable softness needed for good workability.

It is known, however, that lead containing glass exerts harmful effects to the environment both during glass and lamp manufacture and in the form of waste arising at the users. Thus, based on environment protection considerations, one has to make efforts to reduce/eliminate lead content in/from mass products made of glass. A European patent application No. EP 603 933 discloses a lead-free glass composition which is suitable for use in electric lamps, primarily in stem glasses and fluorescent lamp bulb glasses. Although the glass compositions described in it closely approximate the lead-containing ones as to their application parameters (e.g. electric resistance, workability, thermal expansion, etc.), their viscosity values are much higher than those of the lead glass. Due to this, they require higher flame temperatures, i.e. more energy to be supplied during the manufacture of a lamp, which is disadvantageous particularly in the case of high-speed production lines. It is also disadvantageous that these glass compositions contain a substantial amount of barium and strontium oxides (7 to 11 mass % BaO, 1 to 5 mass % SrO). Although BaO is presently qualified as less hazardous to the environment than PbO, it is still strongly poisonous and it should be reduced first of all owing to labor hygiene considerations.

In the glass compositions according to European patent application No. EP 603 933, BaO primarily provides for the high electrical resistance (and serves as a substitute for PbO in this respect), and enables the glass to have good workability. The lower limit of BaO content is a critical value according to this disclosure. Using BaO in amounts below 7 mass % reduces not only the electrical resistance of the glass, but also increases its melting, softening and working temperatures which adversely affects workability. SrO is also needed for ensuring good workability.

We set ourselves the objective of developing a glass composition which is suitable for use primarily in electric lamps and in which glass composition the amounts of BaO and SrO can be reduced and SrO can even be fully eliminated in some cases without the impairment of the electrical resistance and the workability parameters of the glass.

SUMMARY OF THE INVENTION

Our investigations led to the recognition that by appropriately choosing the components of the glass composition, the objective set can be entirely achieved. Moreover, some application parameters of the new glass compositions are more favorable than those of either the known PbO-containing compositions or the known compositions having high BaO and SrO content. So, e.g., the electric resistance ($TK_{K100}$) of the new glass composition is higher than those of both glass types mentioned above, and its working temperature is very close to that of the lead glass and is much more favorable than those of the high BaO-content glass compositions mentioned above.

Therefore, the invention relates to a glass composition for electric lamps which contains $SiO_2$, $Al_2O_3$, $Na_2O$, $K_2O$, $Li_2O$, $B_2O_3$, BaO, CaO and MgO, and optionally SrO, $Sb_2O_3$, $MnO_2$, $Fe_2O_3$ and/or $CeO_2$. The composition according to the invention is characterized in that its $B_2O_3$ content is 1 to 5 mass %, $K_2O$ content is 7.2 to 11 mass %, BaO content is 5.5 to 9 mass %, CaO content is 3.1 to 4.5 mass % and MgO content is 2.1 to 4 mass %. In addition to the components listed, it optionally contains maximum 3.5 mass % ZnO, maximum 1.2 mass % $TiO_2$ and maximum 0.8 mass % $P_2O_5$ as well, with the condition that the composition contains CaO, MgO and optionally ZnO in a total amount of at least 5.8 mass %.

DETAILED DESCRIPTION OF THE PREFERRED EMBODIMENTS

Figure 1:
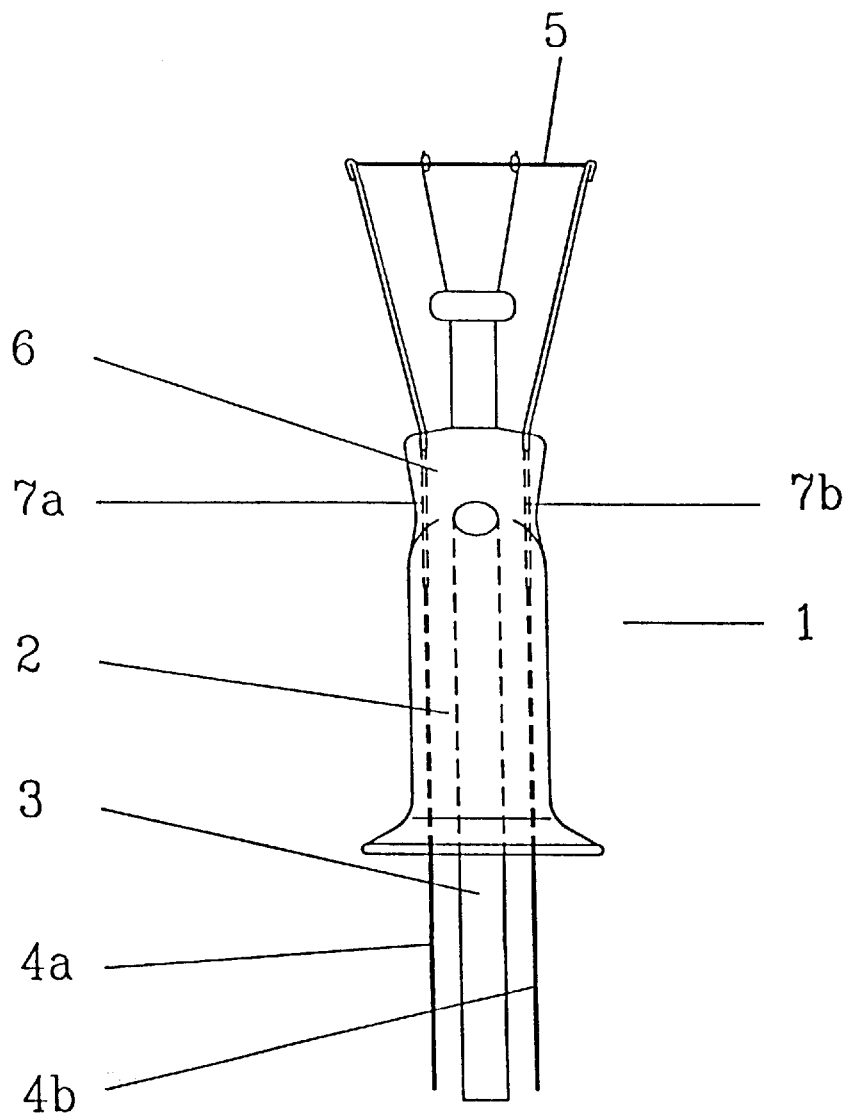
FIG. 1 shows a schematic view of a stem of an electric lamp.

The glass compositions according to the invention fundamentally differ from the known glass compositions with similar purposes by their high CaO and MgO content. So, e.g., in glass compositions according to European patent application No. EP 603 933, the total amount of CaO and MgO can be maximum 5 mass % (in the embodiment disclosed, 3.2 mass %), however this application lists also comparison glass compositions that contain no CaO and MgO at all. CaO is known to increase the insulation performance of the glass, however increasing its amount over 1 to 2 mass % will abruptly impair the workability parameters of the glass (It will first of all raise the transformation temperature $T_g$ of the glass). This is the reason why, to replace lead glass, no glass compositions containing CaO in amounts exceeding 2 to 3 mass % were usually made. So the potential effect of CaO to increase electrical insulation performance remained an opportunity that could not be exploited. The essential feature of our invention is the recognition that by appropriately choosing the components of the glass composition, first of all by using MgO in an amount above the usual, increasing the amount of $K_2O$, and optionally adding ZnO, $TiO_2$ and/or $P_2O_5$, the adverse effects of CaO can be compensated for. In this way, the amount of CaO in the glass compositions can be increased which is associated with the increase in electrical insulation performance and enables to reduce the amount of BaO used for similar purposes. It is also a surprising recognition of ours that the workability parameters of the glass composition will be acceptable even in the case when the amount of BaO is reduced below 7 mass %, a value deemed critical to good workability.

In the glass compositions according to the invention, the amount of CaO can preferably be 3.5 to 4.5 mass %. The amount of MgO is to be chosen so that the total amount of CaO, ZnO and MgO is at least 5.8 mass %. Within this, the total amount of CaO and MgO is preferably at least 5.8 mass %.

It is satisfactory to use BaO in 5.5 to 9 mass % in the glass compositions according to the invention. The amount of BaO can preferably be between 5.5 and 7 mass %.

The glass compositions according to the invention can preferably contain $K_2O$ in 7.7 to 9.4 mass %.

It was an important recognition during the development of the glass compositions according to the invention that the workability of glass can be improved by using $B_2O_3$. We have found that it is preferable to use 1 to 5 mass % $B_2O_3$ in order to obtain the most favorable viscosity characteristic.

The glass compositions according to the invention also differ from the known compositions by containing optionally $TiO_2$ and/or $P_2O_5$ as well. Both substances exert effect primarily on the structure stability i.e. reduce the susceptibility of glass to crystallization and the liquidus temperature. It is preferable if the glass compositions contain totally at least 0.5 mass % $TiO_2$ and $P_2O_5$, i.e. $TiO_2+P_2O_5 > 0.5$ mass %. It is also preferable if the glass compositions have $TiO_2$ content of 0.2 to 1.2 mass % and/or $P_2O_5$ content of 0.2 to 0.8 mass %.

As a further novel feature, the glass compositions according to the invention optionally contain ZnO as well.

The glass compositions according to the invention may contain 60 to 70 mass % $SiO_2$, 1.5 to 4.5 mass % $Al_2O_3$, 5 to 6.9 mass % $Na_2O$, and 0.4 to 1.4 mass % $Li_2O$. Of the other components being optionally present, the amount of $Sb_2O_3$ can be maximum 0.6 mass %, that of $CeO_2$ can be maximum 0.8 mass %, that of $MnO_2$ can be maximum 0.25 mass %, while that of $Fe_2O_3$ can be maximum 0.25 mass %.

The glass compositions according to the invention have the advantage that they generally do not need the presence of SrO, and the amount of SrO being present optionally does not exceed 2 mass %. The boron trioxide component is added to the mixture used for glass melting preferably in the form of borates (e.g. dehydrated borax /$Na_2B_4O_7$/) or a mineral containing a borate (e.g. magnesium hydroborate). With the quantities used, $B_2O_3$ added in the form of a borate or a mineral will have no significant corrosive effect on the wall of the furnace.

The glass composition according to the invention has the particular advantage that it is equally suitable for making stem glass, fluorescent lamp bulb glass and other specialty products (e.g. bulb glass for miniature incandescent lamps). This means that products for different purposes can be manufactured even simultaneously from a given melting furnace which results in optimum production capacity in a more practical way.

In the glass compositions according to the invention, $CeO_2$ is to be preferably used first of all in those cases when fluorescent lamp bulb glasses are (also) intended to be made of the compositions. This substance is primarily suitable for reducing the UV transmission of bulb glasses, but it can also act as a refining agent. Using this substance, the glass composition can also be melted in a full electric furnace. Some of the optional components such as $Sb_2O_3$, $Fe_2O_3$ and $MnO_2$, e.g. $Fe_2O_3$, can be present in the starting mixture of glass melting as a contaminant. To add them separately is unnecessary.

The glass compositions according to the invention can be good replacements for the currently used lead glasses taking into account their technical parameters which determine their applicability in electric lamps such as thermal expansion, viscosity values being characteristic of workability, and electric resistance. At the same time they can be used with more advantages than glass compositions containing greater amounts of BaO and SrO.

Due to their more favorable viscosity properties, the glass compositions according to the invention can be melted and processed with less energy than the materials according to the European patent application No. EP 603 933. Their liquidus point value ($T_{liq}$) being characteristic of the susceptibility to crystallization is also significantly lower than the liquidus point value of the materials according to the European patent application No. EP 603 933 and that of the lead glass. Also, the intensity of crystallization observed in the glass compositions according to the invention is weaker, which indicates the favorable, very weak susceptibility to crystallization. The glass compositions according to the invention have an outstanding resistivity to chemical corrosion which is an extremely surprising result considering their high alkali oxide content.

For the composition and application parameters of the glasses according to the invention, the following example is shown.

EXAMPLE

The glass composition was melted by 50-kg batches in an intermittently-running natural-gas heated tank furnace at 1480° to 1500° C. The components listed in Table I were added in the following forms: $SiO_2$ as quartz sand, $Al_2O_3$ as spodumene, $B_2O_3$ as dehydrated borax, alkali metal oxides as the corresponding carbonates, CaO and MgO as dolomite, $P_2O_5$ as Ca or Na phosphate, and the other substances as the corresponding oxides.

For refining agents, sodium or barium sulfate and starch, and, as another solution, antimony oxide and sodium nitrate were used. In some cases $Fe_2O_3$ was weighed separately, but the use of raw materials contaminated to various extents by iron was mostly preferred. The components to be added in small quantities (sulfates, starch, titanium dioxide, bone ash, etc.) were premixed with some quartz sand in advance in a laboratory mixer, and then added to be mixed with the other components. Melting was carried out after 30 minutes of homogenization using the routine method of glass industry. Using both refining techniques, the compositions have resulted in a good quality melt that could be well refined and favorably processed.

The composition details and the application parameters of the glass compositions according to the invention are summarized in Tables I and II, respectively. For comparison, Table II lists the corresponding data of a known 20% PbO containing glass composition (denoted by "P" in Table II) and of the glass composition described in European patent application No. EP 603 933 (denoted by "B" in Table II), as well.

The definitions of the further symbols used in Table II are as follows.

$\alpha_{(50-350)}$: thermal expansion coefficient between 50° and 350° C. (as per ISO Std. 7991), $T_g$: (dilatometric) transformation temperature (as per ISO Std. 7884-8), $T_L$: Littleton softening point (as per ISO Std. 7884-6), $T_{K100}$: the temperature where the value of $\log\rho$ (ohm cm) is 8 ($\log\rho$ is the common logarithm of the direct-current specific resistance value), $T_{liq}$: liquidus temperature above which the glass shows no crystallization (after a heat treatment lasting 24 hours), Water durability: chemical resistance to distilled water (extraction) as measured on crushed glass and characterized by the quantity of 0.01N acid consumed for back titration (according to DIN Standard 12111), $T_{work}$: working temperature where the value of viscosity $\eta=10^4$ dPa.

TABLE I

| Component | Quantity in mass % |
|---|---|
| $SiO_2$ | 64.43 |
| $Al_2O_3$ | 3.81 |
| $Na_2O$ | 6.53 |
| $K_2O$ | 8.21 |
| $Li_2O$ | 1.02 |
| BaO | 6.73 |
| CaO | 3.63 |
| MgO | 2.24 |
| $B_2O_3$ | 2.13 |
| $TiO_2$ | 0.52 |
| $P_2O_5$ | 0.30 |
| $Sb_2O_3$ | 0.30 |
| $Fe_2O_3$ | 0.15 |

TABLE II

| Physical parameter | Glass example according to the invention | "P" | "B" |
|---|---|---|---|
| $\alpha_{(50-350)} \times 10^{-7}$ (1/°C.) | 98 | 98.9 | |
| $\alpha_{(25-300)} \times 10^{-7}$ (1/°C.) | | | 92.5 |
| Tg (°C.) | 505 | 441 | |
| $T_L$ (°C.) | 682 | 630 | 675 |
| $T_{work}$ (°C.) | 992 | 1000 | 1020 |
| $T_{K100}$ (°C.) | 308 | 280 | 290 |
| Water durability, (ml/g) | 0.6 | 2.5 | |
| Density (g/cm³) | 2.59 | 2.8 | 2.62 |
| $T_{liq}$ (°C.) | 765 | 850 | 840 |

Of course, the glass according to the invention can be used in all fields where the advantages provided by the properties of the glass are needed particularly in the case of glass parts of electric lamps. The glass can be used primarily as stems and exhaust tubes of incandescent and discharge lamps, in addition as bulbs and exhaust tubes of low-pressure discharge lamps preferably of compact fluorescent lamps, and as bulbs of miniature incandescent lamps.

The glass parts of electric lamps made of the glass composition according to the invention are subject matters of the invention.

Figure 2:
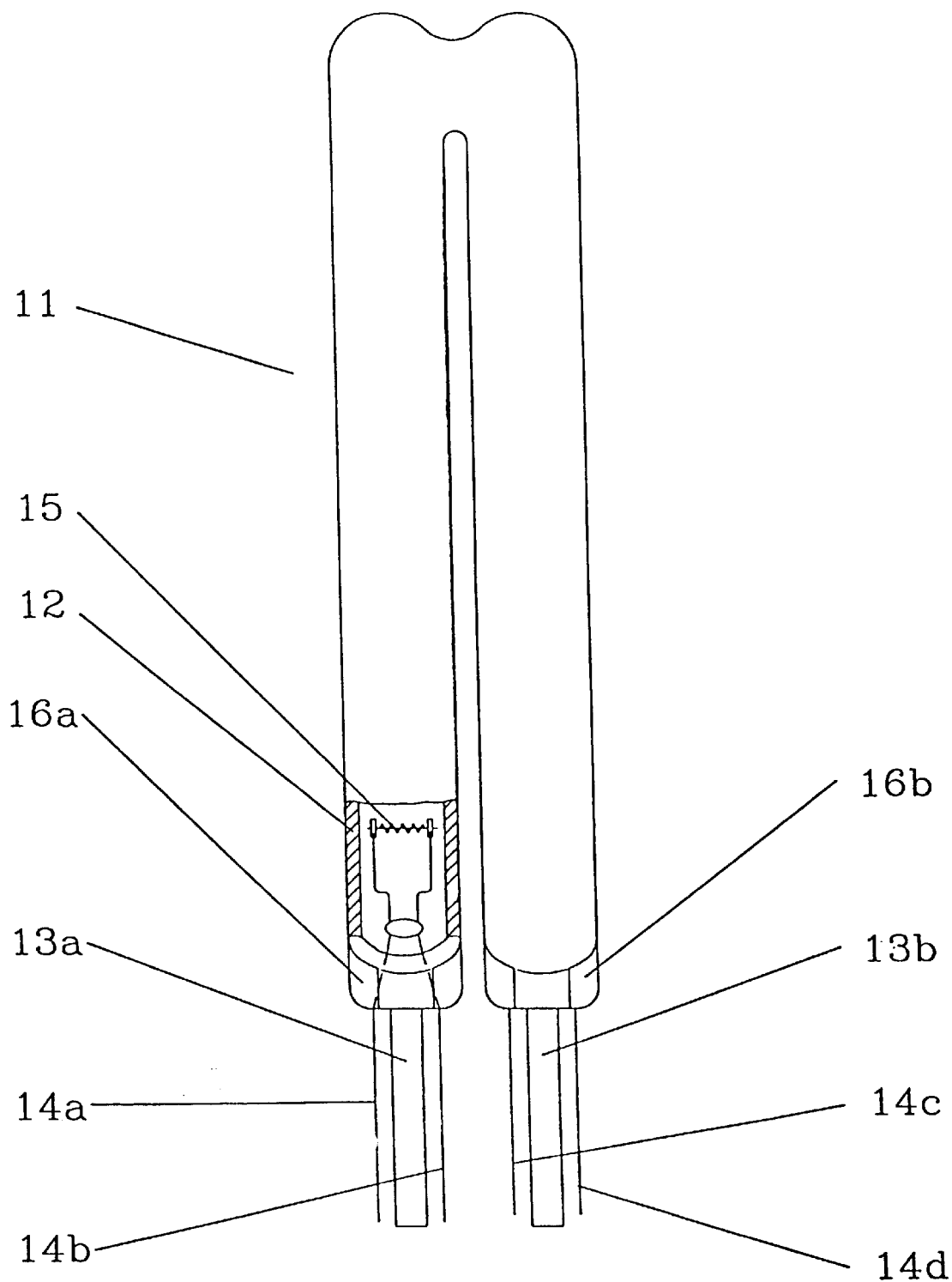
FIG. 2 shows a schematic view of a compact fluorescent lamp.

In FIG. 1 and FIG. 2, the stem of an electric lamp and a compact fluorescent lamp are shown as examples, respectively.

In FIG. 1, stem 1 of an incandescent lamp is seen which stem 1 consists of a flare 2, lead-in-wires 4a and 4b, a filament 5 and an exhaust tube 3. The filament 5 is clamped between the ends of the multipart lead-in-wires 4a and 4b. On the production line, the parts listed are heated by a flame and the parts are sealed together by pinching the flare 2 so that the dumet (copper-clad nickel-iron alloy) portions 7a and 7b of the lead-in-wires 4a and 4b get into the pinched portion 6 of the flare 2. The material of the flare 2 and the exhaust tube 3 is the glass composition according to the invention. The material of the lamp bulb (not shown) is a soda-lime-silicate soft glass comprising the following basic components: $SiO_2$, $Na_2O$, $K_2O$, CaO, MgO, $Al_2O_3$. The flare 2 is sealed in the lamp bulb at its skirted portion on the production line.

The stem according to the invention may be the stem of, apart from an incandescent lamp, also another type of electric lamps, e.g., a low-pressure discharge lamp particularly a linear fluorescent lamp, etc.

In FIG. 2, a compact fluorescent lamp 11 comprising two tube portions is seen. Lead-in-wires 14a, 14b of its electrode 15 as well as lead-in-wires 14c, 14d of the other electrode (not shown) and exhaust tubes 13a and 13b are sealed in the ends of bulb 12 at pinched portions 16a and 16b. The material of the lead-in-wires 14a, 14b, 14c, 14d is a nickel clad 50—50% nickel-iron alloy. The material of the bulb 12 and the exhaust tubes 13a, 13b is the glass composition according to the invention. In order to filtrate UV radiation, the material of the bulb 12 contains $CeO_2$ in an amount above 0, preferably of 0.3 to 0.6 mass %.

What is claimed is:

1. A glass composition for an electric lamp, said glass composition comprising:

$SiO_2$ $Al_2O_3$ $Na_2O$ $Li_2O$ $K_2O$ 7.2 to 11 weight percent $B_2O_3$ 1 to 5 weight percent BaO 5.5 to 9 weight percent CaO 3.5 to 4.5 weight percent MgO 2.1 to 4 weight percent.

2. The glass composition of claim 1, further comprising $TiO_2$ and $P_2O_5$, and wherein the total amount of $TiO_2$ and $P_2O_5$ is at least 0.5 weight percent.

3. The glass composition of claim 1, further comprising 0.2 to 1.2 weight percent $TiO_2$.

4. The glass composition of claim 1, further comprising 0.2 to 0.8 weight percent $P_2O_5$.

5. The glass composition of claim 1, wherein the glass composition comprises 7.7 to 9.4 weight percent $K_2O$.

6. The glass composition of claim 1, wherein the total amount of CaO and MgO in the glass composition is at least 5.8 weight percent.

7. The glass composition of claim 1, wherein the glass composition comprises 60 to 70 weight percent $SiO_2$, 1.5 to 4.5 weight percent $Al_2O_3$, 5 to 6.9 weight percent $Na_2O$, and 0.4 to 1.4 weight percent $Li_2O$.

8. A stem for an electric lamp, said stem being comprised of the glass composition according to claim 1.

9. A bulb for a fluorescent lamp, said bulb being comprised of the glass composition according to claim 1.

10. The glass composition of claim 1, comprising 5.5 to 7 weight percent BaO.

11. The glass composition of claim 1 further comprising SrO, $Sb_2O_3$, $MnO_2$, $Fe_2O_3$, $CeO_2$, ZnO, $TiO_2$, and $P_2O_5$, and wherein the glass composition has a maximum of 3.5 weight percent ZnO, a maximum of 1.2 weight percent $TiO_2$, and a maximum of 0.8 weight percent $P_2O_5$.

12. The glass composition of claim 1, wherein the glass composition has a maximum of 0.6 weight percent $Sb_2O_3$, a maximum of 0.8 weight percent $CeO_2$, a maximum of 0.25 weight percent $MnO_2$, and a maximum of 0.25 weight percent $Fe_2O_3$.

13. The glass composition of claim 1, further comprising ZnO, and wherein the total amount of CaO, MnO, and ZnO is at least 5.8 weight percent.

14. The glass composition of claim 1, wherein the glass composition is substantially free of SrO.

* * * * *

UNITED STATES PATENT AND TRADEMARK OFFICE
CERTIFICATE OF CORRECTION

PATENT NO. : 5,883,030
DATED : March 16, 1999
INVENTOR(S) : Zoltan Laszlo Bako, et al.

It is certified that error appears in the above-indentified patent and that said Letters Patent is hereby corrected as shown below:

On the title page, item [30]:

"9602086" should be --P9602086--.

Col. 1, line 63, "$(TK_{K100})$" should be --$(T_{K100})$--.

Col. 3, line 10, ">0.5" should be --$\geq$0.5--.

Col. 4, line 63, "0.01N" should be --0.01 N--.

Claim 12, line 1, "claim 1," should be --claim 11,--.

Signed and Sealed this

Twentieth Day of July, 1999

Attest:

Q. TODD DICKINSON

Attesting Officer

Acting Commissioner of Patents and Trademarks